(12) United States Patent
Zietlow et al.

(10) Patent No.: US 6,180,158 B1
(45) Date of Patent: Jan. 30, 2001

(54) PROCESS FOR AERATED CONFECTION

(75) Inventors: Philip K. Zietlow, Wayzata; Bernhard van Lengerich, Plymouth; James L. Stinson, Orono; Gerald L. Wilson, New Hope; Mathew F. Langenfeld, Rosemount, all of MN (US)

(73) Assignee: General Mills, Inc., Minneapolis, MN (US)

( * ) Notice: Under 35 U.S.C. 154(b), the term of this patent shall be extended for 0 days.

(21) Appl. No.: 09/107,168

(22) Filed: Jun. 12, 1998

(51) Int. Cl.$^7$ .................................................. A23G 3/00
(52) U.S. Cl. .................. 426/571; 426/572; 426/660; 426/470; 426/516
(58) Field of Search .................. 426/571, 660, 426/470, 572, 516

(56) References Cited

U.S. PATENT DOCUMENTS

| | | | | |
|---|---|---|---|---|
| H1322 | * | 6/1994 | Moore et al. .................. | 426/572 |
| 2,187,122 | * | 1/1940 | Guth .................. | 426/571 |
| 2,238,164 | * | 4/1941 | Edwards .................. | 426/571 |
| 2,847,311 | * | 8/1958 | Doumak et al. .................. | 426/571 |
| 3,062,661 | * | 11/1962 | Doumak .................. | 99/134 |
| 3,206,315 | * | 9/1965 | Anderson et al. .................. | 99/134 |
| 3,345,186 | * | 10/1967 | Kania et al. .................. | 426/470 |
| 3,365,331 | * | 1/1968 | Miller et al. .................. | 127/30 |
| 3,556,812 | | 1/1971 | Krohn et al. .................. | 99/134 |
| 3,607,309 | | 9/1971 | Olney et al. .................. | 99/134 |
| 3,649,302 | * | 3/1972 | Daggy et al. .................. | 99/139 |
| 3,981,739 | * | 9/1976 | Dmitrovsky et al. .................. | 127/60 |
| 4,251,561 | | 2/1981 | Gajewski .................. | 426/571 |
| 4,272,558 | * | 6/1981 | Bouette .................. | 426/660 |
| 4,338,350 | * | 7/1982 | Chen et al. .................. | 426/658 |
| 4,362,757 | * | 12/1982 | Chen et al. .................. | 426/599 |
| 4,410,555 | | 10/1983 | Richardson .................. | 426/572 |
| 4,415,595 | | 11/1983 | Takemori et al. .................. | 426/101 |
| 4,597,980 | * | 7/1986 | Böttcher et al. .................. | 426/568 |
| 4,640,717 | * | 2/1987 | Shukla et al. .................. | 127/58 |

(List continued on next page.)

OTHER PUBLICATIONS

Ali Konis, "Candy Technology", pp. 49–61, 69, 1979.*

Minifie, "Chocolate, Cocoa, and Confectionery", $2^{nd}$ ed., pp. 424–431, 704–714, 1980.*

Mercier, "Extrusion Cooking", pp. 147–153, 1989*

Minifie, "Chocolate, Cocoa, and Confectionery", $3^{rd}$ ed., pp. 508–512, 539–541, 547–549, 567–574, 1989.*

Van Der Schaaf, Dec. 17, 1974, *The Mondomix Process for the Manufacture of Aerated Sugar Confectionery*.

1992, Commercial Brochure Bepex Corporation.

*Primary Examiner*—Cynthia L. Nessler
(74) *Attorney, Agent, or Firm*—John A. O'Toole; Douglas J. Taylor; Everett G. Diederiks, Jr.

(57) ABSTRACT

A continuous method for preparing an aerated confection, especially marshmallows, includes the steps of A. continuously forming a clear concentrated sugar syrup in a single vessel by continuously admixing to form a sugar syrup slurry; cooking the sugar syrup slurry with agitation and indirect heat to dissolve the solids, concentrating the sugar syrup by evaporating water as vapor and venting the vapor to form a concentrated clear syrup, wherein the residence time of the syrup within the vessel ranges from about 1 to 5 minutes; B. cooling the clear concentrated syrup without crystallization to form a cooled clear sugar syrup; C. admixing the clear cooled sugar syrup with about 1 to 30% of a foam structuring agent to form a liquid confection blend; D. seeding the liquid confection blend with dry sugar crystals to form a seeded liquid confection blend; E. aerating the seeded liquid confection blend to form an aerated confection plastic foam; F. extruding the aerated foam to form a plastic aerated confection extrudate rope; G. cooling the extrudate rope to solidify the confection to form a set aerated confection extudate rope; H. forming the set aerated confection extrudate rope into pieces; and, I. Drying the pieces to a moisture content of about 1 to 5% to form dried aerated confection pieces.

38 Claims, 1 Drawing Sheet

U.S. PATENT DOCUMENTS

| | | | |
|---|---|---|---|
| 4,774,100 | 9/1988 | Markwardt et al. | 426/572 |
| 4,785,551 | 11/1988 | Meyer | 34/10 |
| 4,913,924 | 4/1990 | Moore | 426/578 |
| 4,925,380 | 5/1990 | Meisner | 428/131.1 |
| 4,970,084 * | 11/1990 | Pirrotta et al. | 426/289 |
| 5,019,404 | 5/1991 | Meisner | 426/249 |
| 5,030,460 | 7/1991 | Baggerly | 426/103 |
| 5,030,469 * | 7/1991 | Mergelsberg | 426/564 |
| 5,388,772 * | 2/1995 | Tsau | 241/17 |
| 5,429,830 * | 7/1995 | Janovsky et al. | 426/94 |
| 5,532,017 | 7/1996 | O'Donnell et al. | 426/571 |
| 5,580,601 * | 12/1996 | Ribadeau-Dumas et al. | 426/660 |
| 5,582,351 * | 12/1996 | Tsau | 241/17 |
| 5,789,002 | 8/1998 | Duggan et al. | 426/3 |
| 5,925,387 * | 7/1999 | Gimmler et al. | 426/5 |

* cited by examiner

PROCESS FOR AERATED CONFECTION

FIELD OF THE INVENTION

The present invention relates to food processing methods. More particularly, the present invention relates to methods for making aerated confections such as marshmallows.

BACKGROUND

Methods for preparing candies and confections, especially aerated confections such as marshmallows, often involve the preparation of a concentrated sugar syrup. Traditionally, the preparation of a sugar syrup involve three separate steps including (1) admixing dry sucrose and corn syrups with water to form a slurry, (2) heating to boiling to dissolve the sugars, (3) evaporating moisture to concentrate the syrup to the desired solids concentration. Generally, these steps are performed as separate steps and in batch mode. Batch processing allows for close control over the extent of crystals in the concentrated sugar syrup.

For example, sugar, water and corn syrup are first blended in an agitated kettle to form a slurry. Then, the slurry is heated in the kettle with agitation for an extended time to dissolve the sugar to form a dilute sugar syrup. Next, the sugar syrup is concentrated such as by flash evaporation in a separate piece of equipment or boiling for extended times in the kettle to achieve a concentrated sugar syrup of the desired moisture level.

The type and extent of agitation and rate of concentration are carefully controlled to achieve desired levels of sugar crystals in the syrup. The presence or absence of seed crystals in the concentrated sugar solution profoundly influences the properties of the finished product such as the texture of a dried marshmallow. As a result, the batches of concentrated sugar syrup have a limited "pot life," i.e., must be used within a short time (e.g., 15 to 60 minutes).

The present invention provides improvements in methods for preparing sugar syrups, improvements to methods for preparing confections that involve preparing sugar syrups, and improvements to methods for preparing aerated confections.

In particular, the present invention provides improvements to the methods for preparing aerated confections that are described in copending commonly assigned U.S. Ser. No. 09/107,170 entitled "Multi-Colored Aerated Confectionery Products and Processes for Making" filed Jun. 11, 1998 which is incorporated herein by reference.

The present invention resides in part in the practicing of the three steps previously practiced as separate steps in batch mode in a single piece of equipment and in a continuous mode but with a short residence time. Also, a further improvement is that the present invention contemplates addition of solid sugar in a separate seeding step practiced after concentrating and cooling of the sugar syrup whereby close control over end product texture can be obtained.

An advantage of the present invention is that the limited and irregular pot life feature of batch processing is replaced by continuous processing to produce concentrated sugar syrups in short residence times of 1 to 5 minutes.

An additional advantage is that the present single step continuous method of preparing a concentrated sugar syrup allows for short residence times to which the sugar syrup is exposed to high temperatures. As a result, flavored sugar sources such as concentrated fruit juices can be used while minimizing loss or degradation of associated flavors.

Still another advantage is provided by employing a separate seeding step whereby the sugar crystal properties of the sugar syrup can be closely controlled by simple control over the properties of the sugars being added.

Still another advantage resides in the close control over the texture of aerated confections provided by the present methods by virtue of the seeding of clear sugar syrups immediately prior to aeration.

SUMMARY OF THE INVENTION

In its principal method aspect, the present invention provides a continuous method for preparing an aerated confection, comprising the steps of:

A. continuously forming a clear concentrated sugar syrup in a single vessel by continuously admixing to form a sugar syrup slurry:
  1) a first source of a nutritive carbohydrate sweetener,
  2) a second source of a nutritive carbohydrate sweetener in the form of a sugar syrup,
  3) sufficient amounts of water to form a sugar syrup slurry having a moisture content of about 20 to 30%;
  cooking the sugar syrup slurry with agitation and indirect heat to dissolve the solids,
  concentrating the sugar syrup by evaporating water as vapor and venting the vapor to form a concentrated clear syrup having a moisture content of about 8 to 18% and a discharge temperature of about 220 to 320° F. (104.5 to 160° C.),
  wherein the residence time ("Rt") of the syrup within the vessel ranges from about 1 to 5 minutes;

B. cooling the clear concentrated syrup without crystallization to form a cooled clear sugar syrup having a temperature of about 80 to 185° F. (26 to 85° C.);

C. admixing the clear cooled sugar syrup with about 1 to 30% (dry weight basis) of a foam structuring agent to form a liquid confection blend;

D. seeding the liquid confection blend with a dry sugar crystals in an amount ranging from 1 to 30% (dry weight basis) having a particle size of less than 150 μm to form a seeded liquid confection blend;

E. aerating the seeded liquid confection blend to form an aerated confection plastic foam having a density of about 0.1 to 0.4 g/cc and a temperature of about 105 to 160° F. (40 to 65° C.);

F. extruding the aerated foam at a temperature of about 105 to 150° F. (40 to 65° C.) to form a plastic aerated confection extrudate rope;

G. cooling the extrudate rope to solidify the confection to form a set aerated confection extrudate rope;

H. forming the set aerated confection extrudate rope into pieces; and

I. drying the pieces to a moisture content of about 1 to 5% to form dried aerated confection pieces.

DETAILED DESCRIPTION OF THE INVENTION

Figure 1:
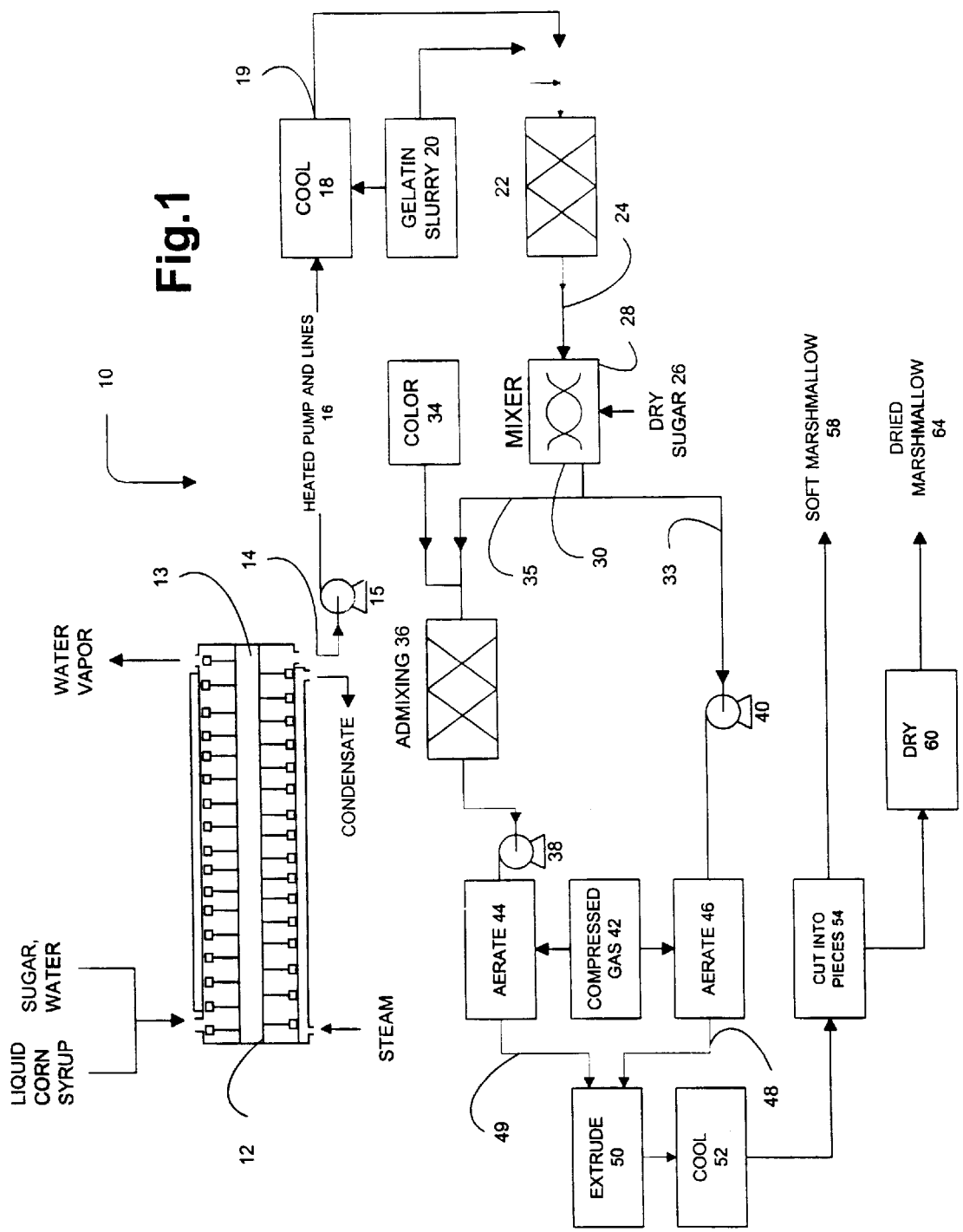
FIG. 1 is a schematic process flow diagram of one preferred embodiment of the present method of preparation.

The present invention provides improvements in methods for preparing concentrated sugar syrups, improvements to methods for preparing confections that involve preparing sugar syrups, and improvements to methods for preparing aerated confections. Each of the steps of the present methods are described in detail below.

Throughout the specification and claims, percentages are by weight and temperatures in degrees Fahrenheit unless otherwise indicated.

Referring now to the drawing, FIG. 1 shows a highly schematic flow diagram of a highly preferred embodiment of the present method referred to generally by reference numeral 10. As there illustrated, the present method includes an essential initial first step 12 of continuously forming a clear concentrated sugar syrup 14 in a single vessel 13. This step 12 involves the substeps of admixing a plurality of sweeteners in a first mixing zone of the vessel 13 including at least one or a first nutritive carbohydrate sweetener(s), preferably in a dry solid form, and at least a second nutritive carbohydrate sweetener, preferably in liquid form such as a sugar syrup (i.e., an aqueous solution of a nutritive carbohydrate sweetener) to form a blended sugar syrup slurry and sufficient amounts of water to dissolve any dry sugar(s). Good results are obtained when the blended sugar syrup slurry prior to being concentrated has a moisture content ranging from about 20 to 30%, preferably about 20 to 25%. Of course, a portion of the moisture content of the blended sugar syrup slurry is provided by the moisture of the sugar syrup such as liquid corn syrup.

The dry solid sugar can be provided by any conventional nutritive carbohydrate sweetening agent including sucrose, dextrose, corn syrup solids, fructose, dried honey, and mixtures thereof. Preferred for use herein is sucrose.

The starting material liquid sugar syrup is preferably corn syrup but can be supplied by any convenient dissolved sweetener including liquid sucrose (e.g., sucrose dissolved in 30% water), invert sugar syrup, honey, hydrolyzed starch syrups (such as corn syrup, high fructose corn syrup, maltose syrup), fruit juices, concentrated fruit juices (e.g., 34 to 60° Brix), fruit purees, concentrated fruit purees and mixtures thereof. Selection of the dry sugar(s) as well as the sugar syrup and their relative proportion depend importantly upon the composition of the finished confection products prepared herein and the finished product attributes desired.

While the sugar syrup can be added at ambient temperature, conveniently, the sugar syrup starting material can be heated to a feed temperature ranging from about 120 to 200° F. (50 to 95°), preferably about 120 to 160° F. (50 to 71° C.). The dry sucrose is conveniently added at ambient temperature. The water can be added at ambient temperature or heated up to boiling (212° F.).

Step 12 further essentially includes a substep of cooking the blended sugar syrup slurry to dissolve any sugar(s) in dry form to produce a clear blended sugar syrup. By "clear" is meant a syrup that is substantially free of any undissolved sugar crystals.

Step 12 still further includes a substep of concentrating the clear blended sugar syrup to form a concentrated clear blended sugar syrup 14. By the addition of indirect heat such as steam fed to the jacket of the cooking vessel 13 or less preferably other heating fluids, water is evaporated from the clear sugar syrup as water vapor which is vented to atmosphere. If desired, a vacuum can be pulled onto the vessel (e.g., 2 to 4 in. $H_2O$; 3 to 8 mm Hg) such as by pulling the evaporate to a condenser. Steam condensate is also drained from the vessel's jacket.

Good results, for example, are obtained when in step 12, the concentrated clear syrup comprises:

| Ingredient | Weight % | Preferred Range |
|---|---|---|
| Sucrose | 20 to 50% | 25 to 35% |
| Corn syrup | 0 to 30% | 10 to 20% |
| Moisture | 8 to 18% | 8 to 12% |

The exit or discharge temperature of the concentrated clear sugar syrup so formed depends importantly upon the solids content or conversely, the moisture content. At a low solids level of 82° Brix (18% moisture) the temperature can be 220° F. (104° C.) at atmospheric pressure up to 320° F. (160° C.) at 92° Brix (8% moisture). The boiling temperature can be reduced modestly by reducing the pressure within the vessel 13 by pulling a modest vacuum.

Equipment suitable for practicing the cooking step is commercially available. Preferred for use to practice the cooking step is a heated agitated cooking vessel such as is available from Bepex Corporation. The vessel is a jacketed horizontally extending apparatus having a rotating axially aligned interior shaft having a multitude of adjustable paddles extending radially from the shaft. The rotating paddles act as a mechanical agitator and toss the dry sugar material upwards thereby exposing the suspended material to the wet sugar syrup. The paddle arrangement and agitator tip speed combine to move the sugar material in a thin annular spiral from the inlet to discharge of vessel 13. The Bepex heated vessel or "turbolizer" is preferred since it is a relatively simple and thus less expensive piece of equipment. Less preferred but nonetheless also suitable for use herein to practice the cooking step is a conventional swept surface heat exchanger. While useful, a swept surface heat exchanger is less desirable since it is a more complicated and thus more expensive piece of equipment compared to a heated turbolizer.

The residence time ("$R_t$") within the cooking vessel 13 is preferably short ranging in the preferred embodiment from about one to five minutes, preferably about two to four minutes.

As a result of the short exposure time to high temperatures, an advantage of the present invention is that all or a portion of either the dry or liquid sugar can be supplied by fruit juices or sources such as fruit juice, fruit juice concentrate, fruit nectars, fruit purees, fruit puree concentrate, honey, and mixtures thereof. In certain embodiments, the clear sugar syrup formed by step 12 can comprise about 1 to 30% (dry basis) of flavor carrying sugar supplied from fruit sources. Shorter residence times within the cooking vessel in practicing step 12 are especially desirable when fruit materials supply a portion of the sugar solids to minimize the loss of desirable flavor.

The residence time can be adjusted by modifying the angle of the paddle, adjusting flow rates, shaft rotational speeds, rate of heating and various combinations.

The operating pressure the cooker of the can be open to the atmosphere. If desired, however, a vacuum of several inches of water can be applied to lower the boiling point temperature of the sugar syrup.

While the present step 12 is expressed in terms of three distinct substeps, it will be appreciated that within cooking vessel 13 the substeps are performed with some overlap between the steps as the syrup advances from the vessel's inlet to the discharge.

Thereafter, the clear concentrated sugar syrup 14 so formed can be used in a variety of food processing applications. For example, the clear concentrated sugar syrup can be topically applied to the exterior of ready-to-eat breakfast cereals to provide a presweetener coating.

The clear concentrated sugar syrup 14 finds particular suitability for use as an intermediate product in the manufacture of confections, especially aerated confections such as marshmallows, especially dried marshmallows.

In preferred embodiments, the present methods 10 further essentially comprise cooling 18 the concentrated clear sugar syrup 14 without forming sugar crystals. Importantly, the sugar syrup 14 is conveyed to the cooling step 18 while substantially maintaining 16 the temperature of the clear concentrated blended sugar syrup 14 (i.e., to within 5° F.) of the discharge temperature from the cooking vessel 13. Maintaining the temperature of the clear syrup can be practiced by using a heated pump 15 in combination with heated lines or piping from the cooking vessel 13 to cooling step 18.

The concentrated sugar syrup 14 is cooled 18 while minimizing the formation and growth of sugar crystals from an incoming temperature that can range from about 220 to 320° F. (104.5 to 160° C.) to a temperature suitable for addition of a foam structuring agent such as gelatin. When subjected to higher temperatures in a sugar syrup, gelatin can exhibit degradation and loss of its foam structuring properties. Good results are obtained when the concentrated clear sugar syrup 14 is cooled to a temperature of about 80 to 185° F. (26 to 85° C.), preferably 100 to 140° F. to form a cooled clear concentrated sugar syrup 19. Of course, when using a foam structuring agent that is more heat tolerant, less cooling is required. Also, since gelatin degradation is a function of both temperature and time, shortening the duration of the process, particularly the post cooling portion of the process, can allow for less cooling. Of course, if gelatin loss is acceptable, the liquid confection blend to-be formed can be formulated with extra gelatin to compensate for any gelatin loss through thermal degradation.

While not critical, a swept surface heat exchanger is preferred for use herein to practice the cooling step 18. Such a heat exchanger forms a thin film on the cooling surface of the heat exchanger. A suitable device for this step sometimes referred to in the art as a "Votator" is described in U.S. Reissue Pat. No. 21,406 to C. W. Vogt, Mar. 19, 1940. Such equipment is commercially available from several food processing manufacturers. Also useful, but less preferred due to its cost, for use for practicing the cooling step 18 is a twin screw extruder. In the present invention, the operating pressure of the twin screw extruder is much lower than on a conventional cooking twin screw extruder and ranges from about on the order of 1 to 5 psia (108 to 136 kPa), and preferably about 1 to 2 psig (115 to 136 kPa). Twin screw extruder usage for practicing this step is less preferred due to the higher cost of such equipment.

The cooling step is preferably practiced to have a short residence time and generally ranges from about 0.25 to 10 minutes, preferably about 1 to 4 minutes.

The present methods 12 further essentially comprise the step 22 of admixing the clear cooled sugar syrup 19 with about 1 to 30%, preferably about 1 to 4%, of a foam structuring agent to form a liquid confection blend 24. Suitable for use herein as the foam structuring agent or gelling component is a hydrocolloid ingredient such as pectin, gelatin, modified starches, albumen, gums and mixtures thereof. For products to be marketed in North America, the preferred structuring agent is gelatin.

The admixing step 22 can involve adding a gelatin-in-water solution or slurry 20. Conveniently, the admixing can be practiced using an in-line static mixer. In another variation of the present methods, and as also depicted in FIG. 1, the cooling step 18 and admixture step 22 can be practiced at least in part simultaneously rather than sequentially. In this variation, all or at least a part of the gelatin slurry 20 can be added directly to the swept surface heat exchanger or other equipment used to practice the cooling step 18.

The present methods further essentially include the step of admixing dry crystalline sugar or seeding 28 the liquid confection blend 24 with dry sugar crystals 26 to form a seeded liquid confection blend 30. The sugar crystals 26 are preferably added to the liquid confection blend 24, i.e., after adding the gelatin structuring ingredient, and less preferably added to the cooled sugar syrup 19 (i.e., before addition of the gelatin). The admixture step can be practiced in a conventional ribbon blender or mixer.

The sugar crystals can be added at about 1 to 30%, preferably about 10 to 20%, and most preferably about 15 to 17%. The sugar crystals should be less than 150 $\mu$m in size, preferably 100 $\mu$m or less in size. Powdered sugar having a mean particle size of about 10 to 30 $\mu$m can also be used. Sugar of the preferred particle size range is commercially available as "Baker's special" type of ground sugar. As the amount of ground sugar seeding increases, the finished dried confections' texture becomes desirably more frangible.

Thereafter the sugar seeded liquid confection blend 30 is pumped to an aerator and the present methods of preparing an aerated confection further essentially comprise the step of aerating the blend to form an aerated confection foam such as aerated foam stream 48.

If desired, the sugar seeded liquid confection blend can be divided into two or into any number of substreams such as a first and a second substream 33 and 35 as depicted in FIG. 1.

The first substream 33, for example, having no color added, is fed to aerator 46 by metering pump 40 to form the first aerated confection substream 48 having, for example, a white color. A color 34 is admixed to the second substream 35 and is fed by metering pump 38 to aerator 44 to form a second aerated confection substream 49 having a second color that is different in color shade or hue from the first aerated confection substream 48. Optionally, but preferably, the color admixture is facilitated by an in-line static mixer 36 that can be downstream of pump 38 or upstream of pump 38 as depicted in FIG. 1. In another variation, the admixture of the color 34 is performed by the whipping action of the aerating step 44 and all or a part of the color added directly to aerator 44. The ratio of seeded liquid confection to color ranges from about 200 to 400:1, preferably about 300:1.

Importantly, each substream has its own means for controlling the volume or amount of seeded liquid confection blend being fed to its respective aerator such as a metering pump. Also, each substream has its own aerator. In the past, a single aerator has been used to prepare a stream of aerated foam. This stream of aerated foam was taught to be divided into substreams of aerated foam. Colorant can then be added to one or more of the substreams to provide substreams of colored aerated foam. Having a single aerator to aerate the entire confection stream provides certain cost advantages relative to having multiple aerators. While more expensive than the post aeration addition of colorant that uses only a single aerator and less colorant, the present methods having a pump and aerator combination for each substream allow for the production of multicolored marshmallows having disparately colored portions of substantially unequal proportion indeed, of substantially unequal proportion, e.g., 95% of one color ("χ") and 15% of the second color ("γ"), or otherwise expressed, the present invention can provide marshmallows wherein the ratio of χ/γ≧1.1 and even as high as χ/γ≅50.

A compressed gas is added to the liquid seeded substream of confection blend 33, 35. Conveniently, just prior to entering the aerator, each supply portion or substream 33,35 crosses a T-junction in the pipes where a gas supply injects gas into the batch. The gas can be nitrogen gas or clean air or other suitable gas. By "clean air", it is meant a de-watered and de-oiled air. The gas is kept at room temperature and a suitable pressure such as at a pressure of 120 to 2,400 Kpa (40 to 150 psig). After the gas is injected at the T-junction, each of the substreams of confection blend along with the injected gas enters its respective aerator. In other variations, all or a portion of the compressed gas can be fed directly to the aerator.

The aeration step forms a foam or aerated confection substream(s) having a density of about 0.1 to 0.4 g/cc. Preferably, the aerated foam is maintained at a temperature ranging from about 105 to 160° F., preferably about 140 to 150° F. If desired, the aerator can include a cooling means such as cooling water to remove the heat buildup that occurs during the aerating step.

One or more substreams 48, 49 of aerated confection are fed to an extruding head or equivalent and the present methods further essentially comprise the step of extruding and/or coextruding 50 the aerated confection at a pumpable temperature such as at about 105 to 150° F. (40 to 65° C.), preferably about 50 to 60° C. to form a plastic confectionery extrudate such as a continuous rope. The plastic rope is characterized by a pattern including a peripheral shape such as a circle, star, animal figure or other shape including both regular or irregular shapes. The pattern can further include colorations including various internal portions or filaments. By "plastic" is meant that the temperature of the extrudate is above the set point temperature of the foam structuring agent. As a result, the rope of extruded foam is easily deformable at these elevated temperatures.

Conveniently, a starch coating can be applied to the extrudate rope (not depicted in FIG. 1) to minimize the stickiness of the rope.

Thereafter, the present methods essentially include a cooling step 52 to allow the structuring agent to set and thereby to form an aerated confection such as a marshmallow. The marshmallow can have a moisture content of about 5 to 20%, preferably about 5 to 15%.

The present methods can further comprise the step of forming or cutting 54 the cooled aerated confectionery rope into pieces of desired shape and size.

In the manufacture of soft marshmallow or other soft confections, the finished products soft marshmallow 58 so prepared are ready for conventional packaging for distribution for sale.

However, in the preparation of a dried aerated confection, the present methods 12 additionally comprise a finish drying step 60 and each of the individual and destarched pieces can be dried. Any suitable drying technique which will remove the moisture content to be about 2 to 4% is adequate. A marshmallow drying method is taught in U.S. Pat. No. 4,785,551 entitled "Method of Drying Confection Pieces" which is incorporated herein by reference. The '551 patent teaches a rapid, five minute drying step using a two-step fluidized bed heating step.

In another technique preferred herein, the marbits are dried at a slower rate using forced hot air convection drying. For example, the pieces can be put on trays, mounted in a frame that holds about 30 to 40 trays, and rolled into a drying room until adequately dried. The drying room is kept at a warm temperature, for example, about 82.2° C. (180° F.). In other implementations, the pieces are transported by a conveyor through a drying room or tunnel until the desired moisture content is reached.

The resulting dried pieces 64 can then be consumed as confections. The dried marshmallow pieces 64 find particular suitability for use as an appealing added component of food products. For example, the pieces 64 can be added to a Ready-To-Eat ("R-T-E") breakfast cereal, especially sugar coated R-T-E cereals intended as children's breakfast cereals.

In a preferred embodiment, the finished RTE cereal can comprise about 65 to 99% of a conventional dried cereal (such as flakes, shreds, puffs formed from a cooked cereal grain or dough of oats, wheat, corn, barley, rice or mixtures) and about 1% to about 35% by weight of the present novel dried confections 64, preferably about 20 to 30%.

A further advantage of the present invention is that the dried marshmallow pieces 64 exhibit less hardness and greater frangibility resulting from the seeding step.

Dried marshmallow pieces 64 can be fabricated by the present methods that contain, for example, 5% of one color and 95% of a second color. Moreover, one or more of the disparately colored portions can be discontinuous rather than in a single continuous phase.

What is claimed is:

1. A continuous method for preparing an aerated confection, comprising the steps of:

A. continuously forming a clear concentrated sugar syrup in a single vessel by continuously admixing to form a sugar syrup slurry:
   1) a first source of a nutritive carbohydrate sweetener,
   2) a second source of a nutritive carbohydrate sweetener in the form of a sugar syrup,
   3) sufficient amounts of water to form a sugar syrup slurry having a moisture content of about 20 to 30%;
   cooking the sugar syrup slurry with agitation and indirect heat to dissolve the solids,
   concentrating the sugar syrup by evaporating water as vapor and venting the vapor to form a concentrated clear syrup having a moisture content of about 8 to 18% and a discharge temperature of about 220 to 320° F. (104.5 to 160° C.),
   wherein the residence time ("$R_t$") of the syrup within the vessel ranges from about 1 to 5 minutes;

B. cooling the clear concentrated syrup without crystallization to form a cooled clear sugar syrup having a temperature of about 80 to 185° F. (26 to 85° C.);

C. admixing the clear cooled sugar syrup with about 1 to 30% (dry weight basis) of a foam structuring agent to form a liquid confection blend;

D. seeding the liquid confection blend with a dry sugar crystals in an amount ranging from 1 to 30% (dry weight basis) having a particle size of less than 150 μm to form a seeded liquid confection blend;

E. aerating the seeded liquid confection blend to form an aerated confection plastic foam having a density of about 0.1 to 0.4 g/cc and a temperature of about 105 to 160° F. (40 to 70° C.);

F. extruding the aerated foam at a temperature of about 105 to 150° F. (40 to 65° C.) to form a plastic aerated confection extrudate rope;

G. cooling the extrudate rope to solidify the confection to form a set aerated confection extrudate rope; and H. forming the set aerated confection extrudate rope into pieces.

2. The method of claim 1 additionally comprising, between steps C and D, the step of conveying the clear concentrated sugar syrup while maintaining the temperature within 5° F. of the discharge temperature to prevent crystallization; and further comprising the step of:

I. drying the pieces to a moisture content of about 1 to 5% to form dried aerated confection pieces.

3. The method of claim 1 additionally comprising the step of dividing the seeded liquid confection blend into at least a first and a second substreams to form a first seeded liquid confection blend substream having a first color and a second seeded liquid confection blend substream and adding a colorant to the second seeded liquid confection blend substream to form a second substream having a second color.

4. The method of claim 3 additionally comprising the step of drying the pieces to a moisture content of about 1 to 5% to form dried aerated confection pieces.

5. The method of claim 3 wherein the ratio of first substream ($\chi$) to second substream ("$\gamma$") ranges from about 1:1.1 to 1:50.

6. The method of claim 5 additionally comprising the step of:

I. drying the pieces to a moisture content of about 1 to 5% to form dried aerated confection pieces.

7. The method of claim 5 wherein the step of dividing the seeded liquid confection blend involves forming at least three unequal substreams.

8. The method of claim 7 additionally comprising the step of:

I. drying the pieces to a moisture content of about 1 to 5% to form dried aerated confection pieces.

9. The method of claim 1 wherein in step A at least a portion of the first source of a nutritive carbohydrate sweetener is in the form of a dry particulate solid.

10. The method of claim 9 additionally comprising the step of drying the pieces to a moisture content of about 1 to 5% to form dried aerated confection pieces.

11. The method of claim 9 wherein at least a portion of the first source of a nutritive carbohydrate sweetener is in the form of a dry particulate solid.

12. The method of claim 11 wherein at least a portion of the first source of a nutritive carbohydrate sweetener is sucrose.

13. The method of claim 12 wherein at least a portion of the concentrating substep is practiced under a partial vacuum.

14. The method of claim 13 wherein the step is practiced to cause the sugar syrup to traverse an annular spiral within the vessel.

15. The method of claim 9 wherein at least a portion of the first source of a nutritive carbohydrate sweetener is sucrose.

16. The method of claim 15 wherein the cooling step C and admixing step D are practiced sequentially.

17. The method of claim 15 wherein at least a portion of the cooling step B is practiced in a swept surface heat exchanger.

18. The method of claim 15 wherein at least a portion of the cooling step B is practiced in a twin screw extruder.

19. The method of claim 18 wherein the operating pressure within the twin screw extruder is about 1 to 10 psig.

20. The method of claim 15 wherein at least a portion of sucrose is in the form of a sugar syrup of liquid sucrose.

21. The method of claim 20 additionally comprising the step of drying the pieces to a moisture content of about 1 to 5% to form dried aerated confection pieces.

22. The method of claim 15 additionally comprising the step of drying the pieces to a moisture content of about 1 to 5% to form dried aerated confection pieces.

23. The method of claim 15 wherein step A is practiced at atmospheric pressure.

24. The method of claim 23 additionally comprising the step of drying the pieces to a moisture content of about 1 to 5% to form dried aerated confection pieces.

25. The method of claim 15 wherein in step A, at least a portion of the concentrating substep is practiced under a partial vacuum.

26. The method of claim 25 additionally comprising the step of drying the pieces to a moisture content of about 1 to 5% to form dried aerated confection pieces.

27. The method of claim 15 wherein the seeding step E is practiced to seed about 10 to 20% of sugar crystals to the liquid confection blend.

28. The method of claim 27 additionally comprising the step of drying the pieces to a moisture content of about 1 to 5% to form dried aerated confection pieces.

29. The method of claim 27 wherein step A is practiced to cause the sugar syrup to traverse an annular spiral within the vessel.

30. The method of claim 29 additionally comprising the step of drying the pieces to a moisture content of about 1 to 5% to form dried aerated confection pieces.

31. The method of claim 27 wherein the foam structuring ingredient is gelatin.

32. The method of claim 31 additionally comprising the step of drying the pieces to a moisture content of about 1 to 5% to form dried aerated confection pieces.

33. The method of claim 31 wherein the pieces have a moisture content of about 10 to 15%.

34. A method of preparing a liquid confection blend seeded with crystalline sugar and useful for the preparation of aerated confections, comprising the steps of:

A. discharging from a vessel a clear liquid confection blend having a discharge temperature and comprising:
   1. 50% to 94% of nutritive carbohydrate sweeteners,
   2. 1 to 30% of a aerated confection foam structuring agent, and
   3. about 5 to 20% moisture;

B. conveying the clear liquid confection blend while maintaining the temperature within 5° F. of the discharge temperature to prevent crystallization; and C. seeding the liquid confection blend with dry sugar crystals in an amount ranging from 1 to 30% (dry weight basis) having a particle size of less than 150 $\mu$m to form a seeded liquid confection blend.

35. The method of claim 24 wherein the clear sugar syrup has a temperature of about 50 to 185° F.

36. The method of claim 35 wherein the seeding step B is practiced to seed about 10 to 20% of sugar crystals to the liquid confection blend.

37. The method of claim 36 wherein the sugar has a particle size of less than 100 $\mu$m.

38. The method of claim 36 wherein the liquid blend comprises about 1 to 4% structuring agent and wherein the structuring agent is gelatin.

* * * * *